(12) United States Patent
Menzies, Jr. et al.

(10) Patent No.: US 7,605,720 B1
(45) Date of Patent: Oct. 20, 2009

(54) METHODS AND SYSTEMS FOR TRAFFIC EVENT PRIORITY AND REPORTING

(75) Inventors: John I. Menzies, Jr., Roswell, GA (US); Chris McClellan, Acworth, GA (US); Robert L. Martin, Dunwoody, GA (US); Thomas A. Pratt, Atlanta, GA (US); Bradley Shawn Grant, Smyrna, GA (US); Catherine A. Wurst, Woodstock, GA (US)

(73) Assignee: The Weather Channel, Inc., Atlanta, GA (US)

( * ) Notice: Subject to any disclaimer, the term of this patent is extended or adjusted under 35 U.S.C. 154(b) by 651 days.

(21) Appl. No.: 11/416,730

(22) Filed: May 3, 2006

(51) Int. Cl.
*G08G 1/123* (2006.01)

(52) U.S. Cl. .............. 340/995.13; 340/286.01; 348/149

(58) Field of Classification Search ........... 340/995.13, 340/286; 348/149, 61
See application file for complete search history.

(56) References Cited

U.S. PATENT DOCUMENTS

| | | | |
|---|---|---|---|
| 5,121,430 A * | 6/1992 | Ganzer et al. | 348/E7.025 |
| 7,176,813 B2 * | 2/2007 | Kawamata et al. | 340/995.13 |
| 7,269,505 B2 * | 9/2007 | Zhao et al. | 340/539.13 |
| 2004/0049785 A1 * | 3/2004 | Grzeczkowski et al. | 725/46 |
| 2004/0226043 A1 * | 11/2004 | Mettu et al. | 725/46 |
| 2006/0145892 A1 * | 7/2006 | Gueziec | 340/905 |
| 2008/0201065 A1 * | 8/2008 | Zerod | 701/117 |

* cited by examiner

*Primary Examiner*—Eric M Blount
(74) *Attorney, Agent, or Firm*—Lawrence A. Aaronson, P.C.

(57) ABSTRACT

Systems and methods for selecting, sequencing, and presenting traffic events to viewers. This may involve using a prioritizing scheme that estimates the proximity or relevance of the event to the viewers by associating the event with a geographic zone and the viewer with a localized service area served by a particular distribution points of the television content distribution system. In some cases, for each localized service area, zones are given priority values that are used when prioritizing the relevance of traffic events associated with those zones. For viewers in a given localized service area, a first zone may have a higher priority than a second zone, such that in prioritizing traffic events, events associated with the first zone are given a higher priority than events occurring in the second zone. Different zone priority schemes may be associated with a given localized service area at different times of day, week, or year. For example, a zone near the airport may have a higher priority during weekend time periods than during the week.

17 Claims, 3 Drawing Sheets

METHODS AND SYSTEMS FOR TRAFFIC EVENT PRIORITY AND REPORTING

RELATED FIELDS

The present invention relates to traffic event reporting, and more specifically, relates to systems and methods of selecting and prioritizing relevant traffic events for a television viewer.

BACKGROUND

Information about traffic events, such as traffic accidents and road construction, is often useful to individuals traveling or planning to travel. It is desirable to provide information about the traffic events that are likely to be the most relevant to the individuals receiving such information. For example, a commuter living in a suburban community and working in a nearby city may be most concerned about accidents and construction on the expressway that connects his suburban community and the nearby city, as well as other roads that are part of or related to his commute. In the context of television and other media, it is desirable to prioritize or otherwise select viewer-relevant traffic event information.

SUMMARY

Methods and systems of the invention select, sequence, and/or present traffic events to viewers, including individuals who receive television, radio, and Internet media. Embodiments may involve using a prioritizing scheme that estimates the relevance of an event to a viewer. In some embodiments, each viewer is associated with a service area, e.g., the area served by a particular distribution point of a television network, while traffic events that may be relevant to the viewers are each associated with an event zone, typically associated with the geographic area in which the traffic event occurred or is occurring. Relationships between event zones and service areas may be used in determining the relevance of events in event zones to viewers in a service area. Geographically, there may be multiple (or no) distribution points in an event zone. Typically, each distribution point will have its own set of (often unique) relationships with one or more event zones.

Each traffic event may also have a type and/or an associated indication of severity, e.g., a severity index from 1 to 10. Prioritization schemes according to the present invention may take into account the traffic event's zone, type, and/or severity to determine or otherwise estimate its potential relevance to viewers in a particular service area. In general, events with the greatest relevance to viewers associated with a given service area are provided to those viewers. More relevant events are generally presented first.

In some embodiments, for each service area, one or more event zones are given priority values (e.g., one event zone is given priority "1," another event zone is given priority "2," etc.). Such priority values may be used when prioritizing the relevance of traffic events associated with those event zones. For viewers in a given localized service area, a first traffic event zone may have a higher priority than a second traffic event zone, such that in prioritizing traffic events, events associated with the first traffic event zone are given a higher priority than events occurring in the second traffic event zone. Such prioritization may involve any number of event zones. Generally, the indications of priority of event zones can be anything that indicates the relative priority of event zones and/or may also indicate or estimated the level of relevance (e.g., by numerical estimates) to the viewer in a service area.

A variety of priority and sequencing schemes, methods and systems are possible according to the principles of the invention.

Certain embodiments involve different event zone priority schemes that may be associated with a given localized service area at different times of day, week, or year. For example, a zone near the airport may have a higher priority during weekend time periods than during the week.

According to certain embodiments of the invention, there is a method of selecting a sequence of traffic events associated with a geographic area for displaying to viewers who receive the sequence as part of a transmission over a television network. The method involves recognizing traffic events associated with event zones of the geographic area. It also involves, for a localized service area associated with a distribution point of the television network, prioritizing the events using each event's event zone. Events associated with a first zone are prioritized above events associated with a second zone. The method further involves selecting a sequence of events for displaying to viewers associated with the localized service area. Each event may have an associated type, so that among events associated with the same zone, events of a first type are prioritized above events of a second type. Event severity may also be used.

DETAILED DESCRIPTION OF FIGURES

The following detailed description describes specific embodiments of the invention in the context of a television program distributed to viewers through a television distribution system. The invention is not limited to television or television network applications or to traffic information. Those of ordinary skill in the art will understand that the invention has broader applications, for example, in radio, Internet and computer network applications and with other types of information.

Figure 1:
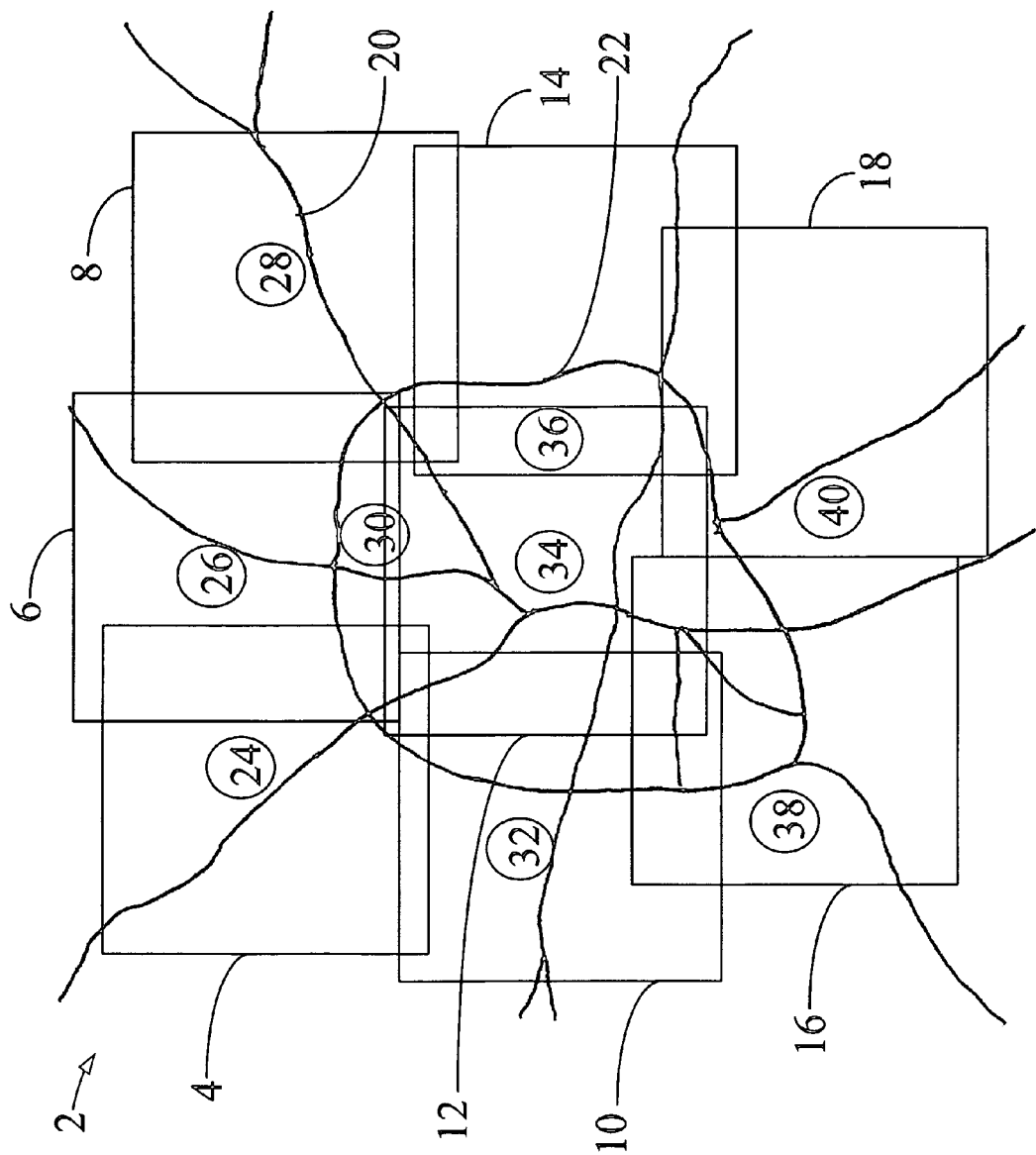
FIG. 1 illustrates a geographic area divided into event zones and in which television viewers receive transmissions over a television network, according to one embodiment of the present invention.

FIG. 1 illustrates a geographic area 2 divided into event zones 4, 6, 8, 10, 12, 14, 16, 18 and in which television viewers (not shown) receive television content through a television distribution system, according to one embodiment of the present invention. The geographic area 2 may include roads such as interstate highway 20 and beltway 22. Television viewers (not shown) located within the geographic area receive television content that is distributed through the television distribution system through distribution points 24, 26, 28, 30, 32, 34, 36, 38, 40. A television viewer will typically receive television content directly from only one distribution point, but may receive signals from more than one. In certain embodiments the geographic location of a given viewer may be estimated based on one or more distribution points associated with that viewer. For example, each distribution point of the television distribution network may be associated with a localized service area (not shown). Viewers receiving television content from a distribution point are considered to be associated with that distribution point's associated localized service area. Because viewers associated with a given localized service area will typically be located in the same general geographic area, the same traffic information is likely to be relevant to those viewers. Likewise, the priority or relative importance of traffic events to those viewers can be estimated to be the same. In certain embodiments, all viewers associated with a localized service area of a television distribution system are provided the same traffic event information.

In certain embodiments, the determination of priority or relative importance of traffic events to viewers associated with a given distribution point takes into account the location of the traffic events. Generally, priority or relative importance relationships can correlate or define relationships between localized service areas and traffic event zones. When traffic events occur in more than one traffic event zone, the correlation or relationship between the traffic event zone for each traffic event and the localized service area for a given viewer can be used to determine the priority of importance of the traffic events to the viewer. For example, if traffic events A and B occur in traffic event zones 4 and 18 respectively, traffic event A may be more relevant to viewers in the localized service area served by distribution point 24 than traffic event B. Conversely, traffic event B may be more relevant to viewers in the localized service area served by the distribution point 40 than traffic event A. Such priorities may be determined using localized service area to traffic event zone correlations or relationships. For example, such relationships may indicate (a) that traffic events occurring in event zone 4 are more relevant that those occurring in event zone 18 for viewers associated with the localized service area associated with distribution point 24 and (b) that traffic events occurring in event zone 4 are less relevant that those occurring in event zone 18 for viewers associated with the localized service area associated with distribution point 40. Such relationships may be established for all localized service area/traffic event zone permutations so that any number of events occurring in any number of event zones may be prioritized for any number of localized service area viewers.

One embodiment of the present invention uses the general location of a television viewer, approximated by the user's localized service area, to provide relevant traffic information to that user. In other words, the television content that is sent to viewers in a given localized service area (through the associated distribution point) is customized to contain information relevant to that localized service area. Thus, in some embodiments, the viewer's general location is estimated by the area serviced by a particular distribution point of the television network. Other embodiments of the invention will use known and yet to be known methods and systems to know, estimate, or otherwise determine the location of viewers.

In certain embodiments, for a localized service area, an event zone prioritization scheme is created. The zone prioritization scheme may be configured in a variety of different ways according to different embodiments of the present invention. Generally, the prioritization scheme will prioritize the relevance of traffic accidents happening in an event zone with respect to other event zones. For example, a prioritization scheme might specify that for the localized service area associated with distribution point 28, zone 8 has a higher priority than zone 18. Such a scheme may estimate that generally viewers associated with that localized service area are more interested in traffic events occurring in zone 8 than in zone 18. Other priority schemes may take into account additional information about the particular traffic patterns and/or the traffic events. For example, if the 7$^{th}$ game of the World Series is at Turner field, which is in zone 12, for a defined time period (prior, during, and after the game) all of the metro Atlanta distribution points may adopt zone 12 as the highest priority zone because of the unusual traffic pattern created.

In another embodiment, a zone priority scheme may, for a localized service area, assign numerical value to the different zones in the geographic area 2. Thus, for the localized service area associated distribution point 28, the traffic event zones may be assigned priorities according to the following table, with lower numbers representing higher priorities:

TABLE 1

Weekday Zone Priority Scheme for the Localized Area Associated with Distribution Point 28

| Zone | Priority |
| --- | --- |
| 4 | 6 |
| 6 | 3 |
| 8 | 1 |
| 10 | 8 |
| 12 | 2 |
| 14 | 4 |
| 16 | 5 |
| 18 | 7 |

The priority scheme of Table 1 may be based on statistical, survey, probabilistic and other suitable techniques for prioritizing relevant information. For example, a survey of viewer preferences could identify the most relevant areas to viewers associated with localized service area 28.

The prioritization of event zones in priority schemes for each localized service area is used for selecting and prioritizing traffic events occurring within the geographic area to display to viewers within the particular localized service areas. Thus, according to the priority scheme shown above in Table 1, a traffic accident in zone 8 would have a higher priority than a traffic accident in zone 18. This priority could then be used to make sequencing, selection, and other prioritization determinations, which may be automated or semi-automated. As an example, a television network may desire to show users up to the four most relevant traffic events and to show higher priority events before lesser priority events. In the case where there is a single traffic accident in each of the zones 4, 6, 8, 10, 12, 14, 16, 18, only accidents in zones 8, 12, 6, and 14 would be transmitted to viewers in localized service area 28 according to the priority scheme of table 1. Moreover, the accident in zone 8 may be presented before the accident in zone 12, which may be before the accident in zone 6, which may be before the accident in zone 14.

Viewers in another localized area may receive different traffic events in different orders depending upon the priority scheme associated with the given localized service area. For example, if the localized service area associated with distribution point 38 has the priority scheme shown in Table 2 below, viewers in that localized service area would receive transmissions of traffic events in zones 16, 12, 10, 18, in that order, when one traffic event occurred in each zone.

TABLE 2

Weekday Zone Priority Scheme for the Localized Area Associated with Distribution Point 38

| Zone | Priority |
| --- | --- |
| 4 | 5 |
| 6 | 7 |
| 8 | 6 |
| 10 | 3 |

TABLE 2-continued

Weekday Zone Priority Scheme for the Localized Area
Associated with Distribution Point 38

| Zone | Priority |
|---|---|
| 12 | 2 |
| 16 | 1 |
| 18 | 4 |

Note that the geographic area may include event zones that are not at all relevant to a particular localized service area within it. For example, in some embodiments the geographic area will be larger than a given metro area and may even include the entire United States of America. Traffic events in far away zones may not be relevant to a service area to be included or prioritized. Thus, a prioritization scheme for a localized service area within a geographic area may include indications of priority of event zones within the geographic area that are relevant and exclude indications for those that are not relevant. Event zones relevant to localized service area 28, shown in FIG. 1, may be different from those relevant to event zone 38. For example, Table 2 does not include an entry for event zone 14 because traffic events in that zone have been determined, in this example, to not be sufficiently relevant (or above a certain threshold of relevance) to display to viewers associated with the localized service area associated with distribution point 38.

Traffic Events may be associated with one or more roads, intersections, or travel areas. As examples, traffic events include events such as one or more auto accidents blocking 2 lanes of I-75 Southbound, moderate traffic on GA 400 Northbound caused by road construction, a bridge out preventing travel in either direction on I-85 at a particular location, and a traffic light out at the intersection of two roads. Generally, any occurrence or combination of occurrences having an impact on traffic may be considered a traffic event. Traffic event information may come from a variety of sources, including from reporting services such as Traffic Pulse® and state agencies such as a state's Department of Transportation, among other sources.

Another aspect of certain embodiments of the invention, involves different event zone priority schemes that may be associated with a given localized service area at different times of day, week, or year. As examples, a zone near the airport may have a higher priority during peak travel periods, a zone near an entertainment district may have a higher priority at night and on certain days of the week, a zone near a business district may have a higher priority during work days, and a zone near a sporting event stadium may have a higher priority on game days.

Prioritization Based on Event Type

Systems and methods of the present invention may also utilize indications of traffic event type to select, sequence, and prioritize traffic events. Traffic events may thus be given an indication of type. For example, an overturned tractor trailer traffic event may be given a type "INCIDENT" and a repaving construction traffic event may be given a type "CONSTRUCTION." INCIDENT traffic events may be given a higher priority than CONSTRUCTION traffic events, or vice versa. Such priority may allow higher priority items to be presented first to a viewer, followed by lower priority items. It also allows events of certain types to be excluded, e.g., during certain times of day.

Indications of traffic event type and indications of traffic event zone may be used in combination to determine a given event's relevance to viewers in a given service area. For example, the sequence or priority of events may be INCIDENT events associated with a first priority zone then CONSTRUCTION events associated with the first priority zone then INCIDENT events associated with a second priority zone then CONSTRUCTION events associated with the second priority zone then INCIDENT events associated with a third priority zone then CONSTRUCTION events associated with the third priority zone, etc. Thus, in some embodiment, traffic events are prioritized with event zone as the primary selection criteria and event type as the secondary selection criteria. Thus, traffic events are prioritized first by event zone, then within each event zone by event type.

Alternatively, a priority scheme may be structured differently and still utilize traffic event zone and event type indications. For example, the sequence or priority of events may be INCIDENT events associated with a first priority zone then INCIDENT events associated with a second priority zone then CONSTRUCTION events associated with the first priority zone then CONSTRUCTION events associated with the second priority zone then INCIDENT events associated with a third priority zone then CONSTRUCTION events associated with the third priority zone, etc. Any suitable method of using event zone and event type may be used to prioritize, select, or otherwise determine suitable events to provide to a viewer.

Prioritization Based on Event Severity

Systems and methods of the present invention may also use indications of traffic event severity to select, sequence, and otherwise prioritize traffic events. Traffic events may thus be given an indication of priority. For example, a bridge out traffic event may be given a "HIGH" priority, a one lane closed road construction may be given a "LOW" Priority, and a two lanes closed accident may be given "MEDIUM" priority. Any suitable indication of relative priority may be used. Such priority may allow higher priority items to be shown first, followed by lower priority items. It may also allow events of certain severity levels to be excluded, e.g., during certain times of day. For example, certain construction events performed at night or on a weekend day may have a lower priority (or may be considered not relevant at all) while construction performed during rush hour may be considered a medium or high priority.

Traffic event type priority may be used in combination with priority based on the event's event zone and/or the event's type. For example, the sequence or priority of events may be HIGH priority INCIDENT events associated with a first priority zone, MEDIUM priority INCIDENT events associated with a first priority zone, LOW priority INCIDENT events associated with a first priority zone, HIGH priority CONSTRUCTION events associated with the first priority zone, MEDIUM priority CONSTRUCTION events associated with the first priority zone, LOW priority CONSTRUCTION events associated with the first priority zone, HIGH priority INCIDENT events associated with a second priority zone, MEDIUM priority INCIDENT events associated with a second priority zone, LOW priority INCIDENT events associated with a second priority zone, HIGH priority CONSTRUCTION events associated with the second priority zone, MEDIUM priority CONSTRUCTION events associated with the second priority zone, LOW priority CONSTRUCTION events associated with the second priority zone, etc.

Thus, in some embodiments, traffic events are prioritized with event zone as the primary selection criteria, event type as the secondary selection criteria, and event severity as the tertiary selection criteria. Traffic events are prioritized first by event zone, then within each event zone by event type, then within each event type by event severity. This type of layered selection may be employed in some embodiments.

Alternatively, a priority scheme may mix traffic event zone, event type, and event priority information. For example, each of n traffic event zone, event type, and event priority combinations could be associated with a relevance value (e.g., 1-n). Such values could be used to indicate the estimated relevance of an event in each traffic event zone, of each type, and of each severity, and accordingly used to prioritize events when they occur based on the event's particular zone, type, and severity, and the associated relevance value (e.g., a high severity incident in a secondary zone has a greater relative importance than a low priority construction in a primary zone).

Alternative and Additional Selection Criteria

Alternatively, the selection criteria in certain embodiments may involve viewer demographics and/or viewer preferences in addition to (or instead of in some embodiments) location based and traffic event based criteria. For example, in some embodiments, the system may take into account information that a specific viewer does not desire to receive information about traffic events in a specified area or specified road. The system may customize the traffic events based on this viewer preference to provide customized traffic event content. Selection may also be based in part on viewer location and in part on viewer specific preferences. Such selection may utilize any suitable combination of preferences. For example, information about one or more local traffic events relevant to viewers in a localized service area could first be provided to or selected at a cable head end or other distribution point. The head end or distribution point could distribute such local event traffic information to a further point along the distribution channel, for example, to a viewers set-top cable box, where the traffic events could be filtered to remove traffic events that are not in accordance with the viewer's particular preferences.

The processing could take place in one or more of the nodes in the distribution path, depending on the particular system/environment architecture. The location of the processing could depend on a variety of factors including what components (filters, processors, databases, etc.) are used to accomplish the processing, the impact of the data on the network connections (volume, refresh rate, etc.), among other things.

Presentation of Traffic Events

Figure 2:
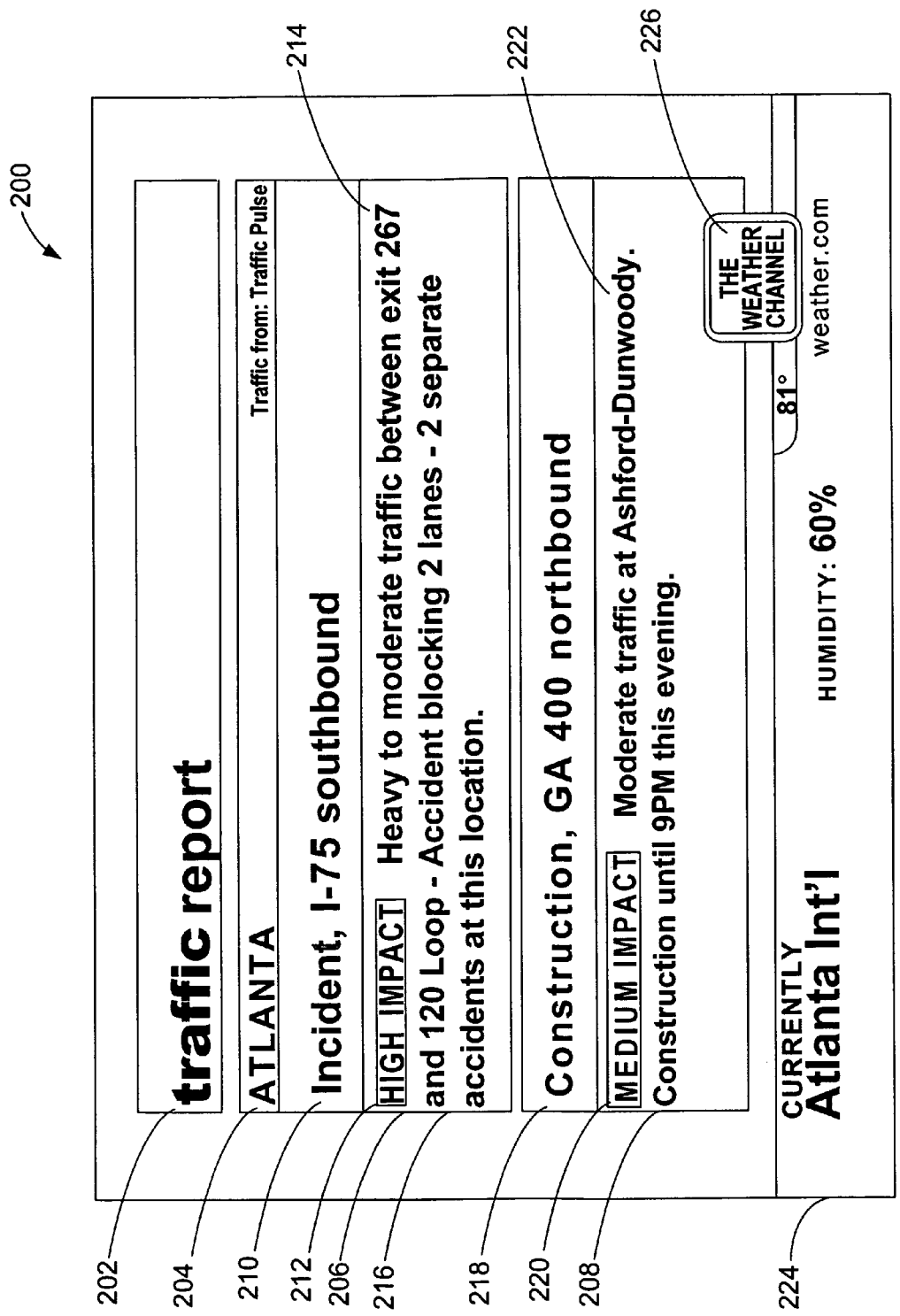
FIG. 2 illustrates a television image showing traffic event reports according to one embodiment of the present invention.

FIG. 2 illustrates a television image 200 showing traffic events according to one embodiment of the present invention. The television image 200 includes a title "traffic report" 202, an area indicator "ATLANTA" 204, and traffic event information 206, 208. The traffic event information 210, 218 may display event reports for different types of events. For example, FIG. 2 shows information about an "Incident" type event 206, and a "Construction" type event 208. Information regarding Incident 206 may identify the traffic event type and traffic event location "Incident, I-75 Southbound" 210 and may describe the events severity 212, e.g., "HIGH IMPACT," and may provide detail 214 about the traffic event, e.g., "Heavy to moderate traffic between exit 267 and 120 Loop—Accident blocking2 lanes—2 separate accidents at this location," which may be separated visually in an area of the screen or box such as box 216.

Similarly, FIG. 2 shows information about a "Construction" type event 208. Information regarding Construction 208 may identify the traffic event type and traffic event location "Construction, GA 400 northbound" 218 and may describe the events severity 220, e.g., "MEDIUM IMPACT," and may provide detail 222 about the traffic event, e.g., "Moderate traffic at Ashford-Dunwoody. Construction until 9 PM this evening." The priority of traffic events is transparent to the viewer who is simply provided with relevant information. The sequence of presentation may reflect the priority of traffic events in some cases with higher priority events typically being shown first and, in some cases, for longer duration than lesser priority events. The television image 200 may also include additional information such as weather information 224 and programming identification information 226.

Figure 3:
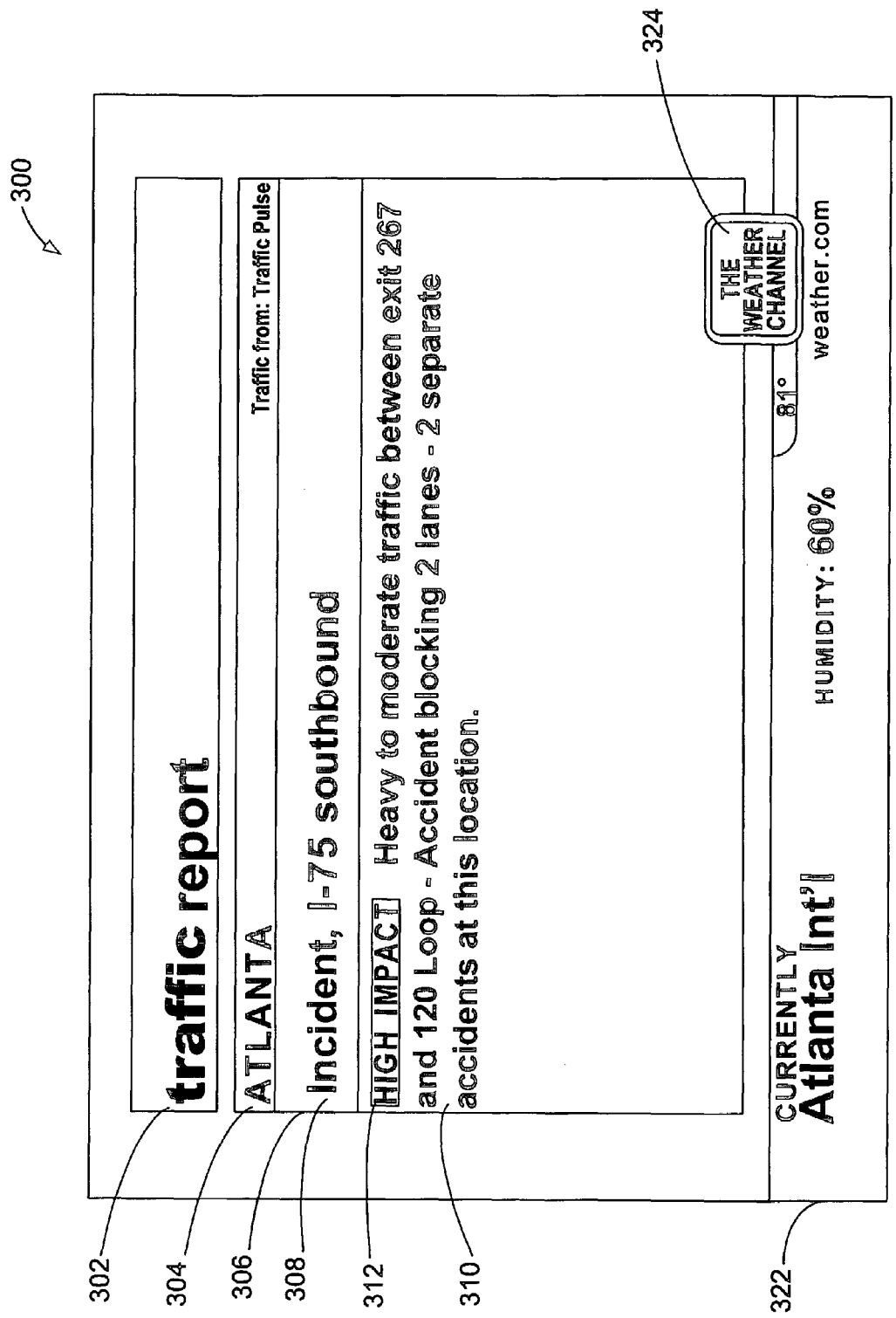
FIG. 3 illustrates another television image showing a traffic event report according to another embodiment of the present invention.

FIG. 3 illustrates another television image 300 showing a traffic event report according to another embodiment of the present invention. In this case, there is only one event to report. The television image 300 includes a title "traffic report" 302, an area indicator "ATLANTA" 304, and traffic event information 306. Information regarding incident report 306 may identify the traffic event type and traffic event location "Incident, I-75 Southbound" 308, may describe the event's severity 312, e.g., "HIGH IMPACT," and may provide detail 310 about the traffic event, e.g., "Heavy to moderate traffic between exit 267 and 120 Loop—Accident blocking 2 lanes—2 separate accidents at this location." The television image 300 may also include additional information such as weather information 322 and programming identification information 324.

Modifications, additions and deletions may be made to the embodiments described above and shown in the accompanying figures without departing from the scope or spirit of the present invention. For example, while the devices and methods described primarily relate to television, other modes of providing information to viewers are envisioned. As another example, although the invention is primarily discussed in the context of traffic events, the methods and systems of the present invention could be used for other types of information.

The invention claimed is:

1. A method of prioritizing traffic events associated with a geographic area for displaying to viewers through a television content distribution system of distribution points and associated service areas, comprising:

determining priority schemes for a plurality of viewers, wherein a first priority scheme indicates relative importance of a plurality of traffic event zones for a first viewer associated with a first localized service area, and a second priority scheme indicates relative importance of the plurality of traffic event zones for a second viewer associated with a second localized service area, wherein the first priority scheme differs from the second priority scheme;

associating a first and a second traffic event with selected traffic event zones, wherein the first traffic event is associated with a first traffic event zone and the second traffic event is associated with a second traffic event zone different from the first traffic event zone;

prioritizing the first and second traffic events for the first localized service area using the first priority scheme, wherein the first traffic event has a greater priority than the second traffic event; and prioritizing the first and second traffic events for the second localized service area using the second priority scheme, wherein the first traffic event has a lesser priority than the second traffic event.

2. The method of claim 1, wherein the first priority scheme further indicates the relative importance of a plurality of traffic event types for a first viewer associated with a first localized service area.

3. The method of claim 1, wherein the first priority scheme further indicates the relative importance of a plurality of traffic event types for a first viewer associated with a first localized service area, and further comprising:
- associating a third traffic event with the first traffic event zone;
- associating the first and third traffic events with traffic event types, wherein the first traffic event is associated with a first traffic event type and the third traffic event is associated with a third traffic event type different from the first traffic event type; and
- prioritizing the first, second, and third traffic events for the first localized service area using the first priority scheme, wherein the first traffic event priority is greater than the third traffic event priority and the third traffic event priority is greater than the second traffic event priority.

4. The method of claim 1, wherein one of the traffic event zones geographically overlap a second of the event zones.

5. The method of claim 1, wherein the geographic area is a metro area.

6. The method of claim 1, wherein the distribution point is a cable head end.

7. The method of claim 1, wherein the first viewer associated with the first localized service area receives television content from a distribution point providing said television content to all other viewers in the localized service area receiving television content from the distribution point.

8. The method of claim 1, wherein the first traffic event and second traffic event occur within a specified time period.

9. The method of claim 1, further comprising selecting location information related to the first traffic event to provide to the first viewer.

10. The method of claim 9, wherein the information related to the first traffic event further comprises a graphical indication of the first traffic event location.

11. The method of claim 1 further comprising selecting information about the first traffic event and information about the second traffic event to provide to the first viewer based on a determination that the first traffic event has a greater priority than the second traffic event.

12. The method of claim 1 further comprising determining to provide information about the first traffic event and no information about the second traffic event to the first viewer based on a determination that the first traffic event has a greater priority than the second traffic event.

13. The method of claim 1 further comprising selecting information about the first traffic event to provide before information about the second traffic event to the first viewer based on a determination that the first traffic event has a greater priority than the second traffic event.

14. The method of claim 1 further comprising receiving information about a third traffic event associated with a third traffic event zone.

15. The method of claim 14 further comprising prioritizing the first, second, and third traffic events for the first localized service area using the first priority scheme, wherein the first traffic event has a greater priority than the second traffic event and the third event is determined not relevant.

16. A method of selecting sequences of traffic events associated with a geographic area for displaying to viewers through a television content distribution system of distribution points and associated service areas, comprising:
- identifying a plurality of traffic events, wherein each event is associated with a type, a severity, and an event zone of the geographic area;
- determining a first priority sequence of the events using the type, severity, and event zone associated with each event, wherein the first priority sequence is determined for a first localized service area associated with a first distribution point of the television network; and
- determining a second priority sequence of the events using the type, severity, and event zone associated with each event, wherein the second priority sequence is determined for a second localized service area associated with a second distribution point of the television network;
- wherein the first priority sequence differs from the second priority sequence.

17. The method of claim 16 wherein events associated with a first traffic event zone are prioritized above events associated with a second traffic event zone, for events associated with a same event zone, events of a first type are prioritized above events of a second type, and for events of a same type, events of a first severity are prioritized above events of a second severity.

* * * * *

UNITED STATES PATENT AND TRADEMARK OFFICE
CERTIFICATE OF CORRECTION

PATENT NO. : 7,605,720 B1  Page 1 of 1
APPLICATION NO. : 11/416730
DATED : October 20, 2009
INVENTOR(S) : Menzies et al.

It is certified that error appears in the above-identified patent and that said Letters Patent is hereby corrected as shown below:

Title Page, Column 1, Item [75], delete "McClellan" and insert --McClellen-- therefore.

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,605,720 B1 | Page 1 of 1 |
| APPLICATION NO. | : 11/416730 | |
| DATED | : October 20, 2009 | |
| INVENTOR(S) | : Menzies, Jr. et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 777 days.

Signed and Sealed this

Fifth Day of October, 2010

David J. Kappos
*Director of the United States Patent and Trademark Office*